J. N. VALLEY.
Clothes Driers.
No. 5,176. Reissued Dec. 3, 1872.
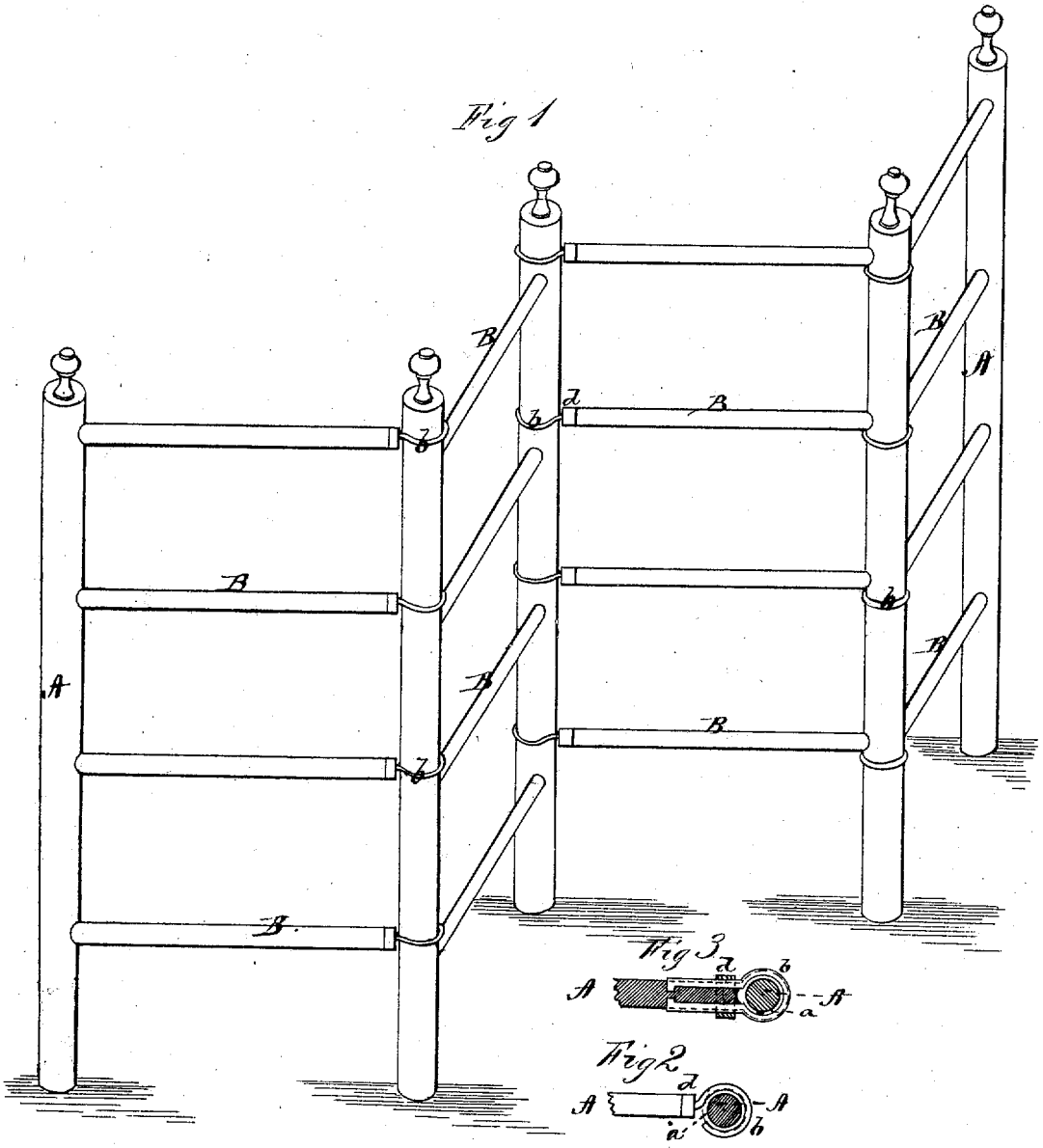
Witness:
Frank L. Durand
C. L. Evert.
Inventor.
John N. Valley.
per
L. Sandusky Wilson
Attorneys.
AM. PHOTO-LITHOGRAPHIC CO. N.Y. (OSBORNE'S PROCESS.)

UNITED STATES PATENT OFFICE.

JOHN N. VALLEY, OF NORTH EAST, PENNSYLVANIA.

IMPROVEMENT IN CLOTHES-DRIERS.

Specification forming part of Letters Patent No. 103,257, dated May 17, 1870; reissue No. 5,176, dated December 3, 1872.

*To all whom it may concern:*

Be it known that I, JOHN NAPOLEON VALLEY, of North East, in the county of Erie and in the State of Pennsylvania, have invented certain new and useful Improvements in Clothes-Driers; and do hereby declare the following to be a full, clear, and exact description thereof, reference being had to the accompanying drawing and to the letters of reference marked thereon making a part of this specification.

The nature of my invention consists in the construction and arrangement of a clothes-drier formed of vertical posts and horizontal bars or stretchers connected together, as hereinafter more fully set forth.

In order to enable others skilled in the art to which my invention appertains to make and use the same, I will now proceed to describe its construction and operation, referring to the annexed drawing, in which—

Figure 1 is a perspective view of the entire clothes-drier; Fig. 2 is a horizontal section, showing one mode of hinging the horizontal bars to the upright posts; and Fig. 3 shows a modification of the said mode of hinging the bars to the posts.

My clothes-drier is made in sections, each section composed of a vertical or upright post, A, and a series of horizontal bars or stretchers, B B, and the sections thus formed hinged together, so that the clothes-drier may be folded up in a very small compass when not in use. The post A is provided with a series of circumferential grooves, *a*, corresponding in number with the horizontal bars B B. In each of these grooves is placed the end of a rod or bar, *b*, which is bent around in said groove, and the other end screwed into or otherwise fastened to the end of the horizontal bar B. A ferrule, *d*, is then placed upon the end of the bar. The rods or bars *b b* may be bent in the middle around the post in the grooves and the ends fitting in grooves on the bars B B, the points being bent inward into said bar. The ferrule *d* is then slipped over to hold said ends to the bar. This mode of hinging is shown in Fig. 3.

By hinging the horizontal bars to the upright posts the clothes-drier can be turned in every direction, or rather each section of the same can be turned in any direction desired. Casters may be put on the bottom of the standards, if so desired.

Having thus fully described my invention, what I claim as new, and desire to secure by Letters Patent, is—

1. The standards A provided with circumferential grooves, *a*, into which are fitted suitable rods or bars, which form the hinge for the clothes-drier, substantially as herein set forth.

2. A clothes-drier formed in sections, with vertical posts A and horizontal bars B hinged to the vertical posts A, for the purpose set forth.

In testimony that I claim the foregoing I have hereunto set my hand this 2d day of October, 1872.

JOHN N. VALLEY.

Witnesses:
C. L. EVERT,
A. N. MARR.